United States Patent
Motomiya et al.

(10) Patent No.: US 7,510,770 B2
(45) Date of Patent: Mar. 31, 2009

(54) DEEP ULTRAVIOLET TRANSMISSIVE ADHESIVE, AND SUBSTRATE PRODUCED BY USING SUCH DEEP ULTRAVIOLET TRANSMISSIVE ADHESIVE

(75) Inventors: Shinsuke Motomiya, Tokyo (JP); Tatsuya Kojima, Tokyo (JP); Takashi Takahashi, Tokyo (JP); Norio Tanaka, Souka (JP)

(73) Assignees: Kabushiki Kaisha Topcon, Tokyo (JP); Tanaka Polymer Laboratory, Souka-shi (JP)

( * ) Notice: Subject to any disclaimer, the term of this patent is extended or adjusted under 35 U.S.C. 154(b) by 0 days.

(21) Appl. No.: 11/394,368

(22) Filed: Mar. 31, 2006

(65) Prior Publication Data

US 2006/0280960 A1 Dec. 14, 2006

(30) Foreign Application Priority Data

Mar. 31, 2005 (JP) .............................. 2005-101546

(51) Int. Cl.
| | |
|---|---|
| *B32B 17/06* | (2006.01) |
| *B32B 17/10* | (2006.01) |
| *B32B 9/00* | (2006.01) |
| *G06K 7/10* | (2006.01) |
| *G02B 13/14* | (2006.01) |

(52) U.S. Cl. ...................... 428/426; 428/441; 428/688; 359/350; 359/355; 359/361

(58) Field of Classification Search ...................... None
See application file for complete search history.

(56) References Cited

U.S. PATENT DOCUMENTS 4,115,617 A * 9/1978 Mitsuishi et al. ............ 428/336

FOREIGN PATENT DOCUMENTS

| JP | 2003-137614 A | 5/2003 |
|---|---|---|
| JP | 2003-185808 A | 7/2003 |
| WO | WO 01/37043 A1 | 5/2001 |
| WO | WO 01/37044 A1 | 5/2001 |

* cited by examiner

*Primary Examiner*—Sheeba Ahmed
(74) *Attorney, Agent, or Firm*—Foley & Lardner LLP

(57) ABSTRACT

A deep ultraviolet transmissive adhesive capable of transmitting deep ultraviolet light which comprises a substance represented by the chemical formula given below, and a substrate produced using the deep ultraviolet transmissive adhesive,

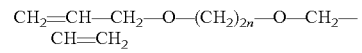

In the above formula, n is an odd number represented by 2m+1 (m being a natural number).

5 Claims, 3 Drawing Sheets and R<sup>c</sup># DEEP ULTRAVIOLET TRANSMISSIVE ADHESIVE, AND SUBSTRATE PRODUCED BY USING SUCH DEEP ULTRAVIOLET TRANSMISSIVE ADHESIVE

TECHNICAL FIELD

This invention relates to a deep ultraviolet transmissive adhesive and a substrate produced by using the deep ultraviolet transmissive adhesive and, more particularly, to a deep ultraviolet transmissive adhesive capable of transmitting ultraviolet rays until wavelength of about 230 nm with high transmittance and a substrate produced by using such deep ultraviolet transmissive adhesive.

RELATED ART

Conventional adhesives cannot be used in the lamination of lens members for use in semiconductor inspecting devices and other precision inspecting devices used in the ultraviolet region, in particular in the deep ultraviolet region. Therefore, a fluorine-containing oil is used as a filler (cf. Japanese Kokai Publication 2003-137614 and Japanese Kokai Publication 2003-185808).

Further, WO 01/37043 A1 and WO 01/37044 A1 respectively disclose such noncrystalline vinyl copolymer-based adhesives (A) and (B) as described below.

Adhesives (A) are produced from $CX_2=CY_2$ and 0-25 mole percent of one or more monomers $CR^aR^b=CR^cR^d$. In this case, X is —F or —$CF_3$ and Y is H. $R^a$, $R^b$ and $R^c$ each is independently selected from among H and F. $R^d$ is selected from the group consisting of —F, —$CF_3$, —ORf, —OH (when $R^c$=H) and Cl (when $R^a$, $R^b$ and $R^c$ each=F). Here, Rf is $C_nF_{2n+1}$ in which n=1 to 3. $CR^aR^b=CR^cR^d$ units are distributed in the copolymers nearly in a random manner.

Adhesives (B) are produced from $CX_2=CY_2$ and 40-60 mole percent of one or more monomers $CR^aR^b=CR^cR^d$. In this case, $CR^aR^b=CR^cR^d$ units are distributed in the copolymers nearly in an alternating manner.

However, the fluorine-containing oil mentioned above may possibly leak out. On such occasions of leakage, a marked deterioration in workability will result.

On the other hand, the adhesives (A) and (B) mentioned above are adhesives for providing ultraviolet transmissive materials which show an absorbance/micron (A/micrometer) of ≦1 in the wavelength region of 187-260 nm. In the case of such adhesives, it is difficult to synthesize the monomers for Cytop (registered trademark) and special grades of Teflon (registered trademark). At the same time, it is also difficult to synthesize the monomers of those adhesives. As a result, the product adhesives become expensive.

SUMMARY OF THE INVENTION

Accordingly, it is an object of the present invention to provide a deep ultraviolet transmissive adhesive which can avoid liquid leakage and is improved in durability against ultraviolet rays and in transmittance in the deep ultraviolet region as well as a substrate produced using such deep ultraviolet transmissive adhesive.

The adhesive according to the invention comprises a substance represented by the chemical formula given below and is a deep ultraviolet transmissive adhesive capable of transmitting deep ultraviolet light.

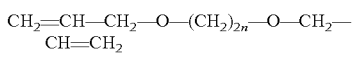

In the above formula, n is an odd number represented by 2m+1 (m being a natural number).

The substrate according to the invention comprises two lens members joined together by means of a deep ultraviolet transmissive adhesive, wherein the deep ultraviolet transmissive adhesive comprises a substance represented by the chemical formula given below and is the substrate as a deep ultraviolet transmissive adhesive capable of transmitting deep ultraviolet light.

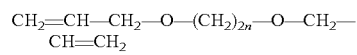

In the above formula, n is an odd number represented by 2m+1 (m being a natural number).

EMBODIMENTS

In the following, a more detailed description is given of the chemical formula $CH_2=CH—CH_2—O—(CH_2)_{2n}—O—CH_2—CH=CH_2$, taking, as examples, the case where m is 1 and the case where m is 2.

When n=2×1+1 (m=1), a deep ultraviolet transmissive adhesive (1) represented by the chemical formula

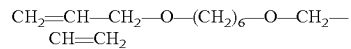

is obtained.

When n=2×2+1 (m=2), a deep ultraviolet transmissive adhesive (2) represented by the chemical formula

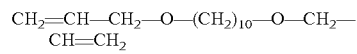

is obtained.

The present invention includes not only the above-mentioned two adhesives but also other deep ultraviolet transmissive adhesives such as those represented by the following chemical formulas, for instance.

When m is 3:

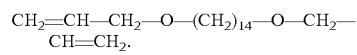

When m is 4:

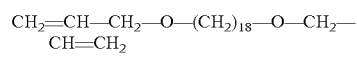

The adhesive may further contain such an additive as UT-10, OCT-2, a siloxane or a silicone. Preferably, the substrate surface is subjected to primer treatment as a measure for preventing peeling, for instance.

EXAMPLES

Figure 1:
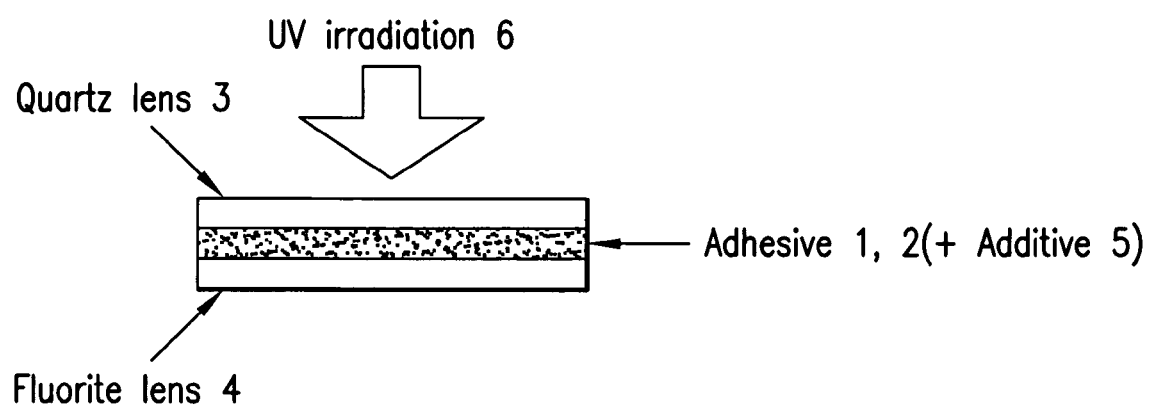
FIG. 1 shows an example of the substrate of the invention in which use is made of a deep ultraviolet transmissive adhesive according to an embodiment of the invention.

FIG. 1 shows an example of the invention.

Adhesion experiments were carried out using the deep ultraviolet transmissive adhesives 1 and 2 mentioned above.

The substrates used were products of joining of a quartz lens 3 to a fluorite (CaF$_2$) lens 4, and the deep ultraviolet transmissive adhesive 1 or 2 was used between the lenses 3 and 4.

The above-mentioned additive 5 may be added according to need.

Each assembly was subjected to UV irradiation in the direction of the arrow 6 from the side of the quarts lens 3.

The ultraviolet (UV) irradiation conditions were as follows: wavelength 365 nm, and intensity 300 or 450 mW/cm$^2$.

After predetermined periods of ultraviolet (UV) irradiation, each substrate was checked for appearance (occurrence or nonoccurrence of turbidity and/or yellowing) and, at the same time, transmittance measurements were carried out.

Referring to Table 1, the adhesive 1 was used as A and B, and the adhesive 2 as C.

TABLE 1

| Adhesive | Primer treatment | Additive | Irradiation period |
| --- | --- | --- | --- |
| A | x | — | 36 h |
| A | o | OCT-2 | 6 h |
| B | x | — | 18 h |
| B | o | — | 6 h |
| B | x | UT-20 | 15 h |
| B | x | OCT-2 | 8 h |
| B | o | OCT-2 | 4 h |
| B | x | Siloxane | 24 h |
| B | x | Silicone | 24 h |
| C | x | — | 60 h |
| C | x | — | 42 h |

Figure 2:
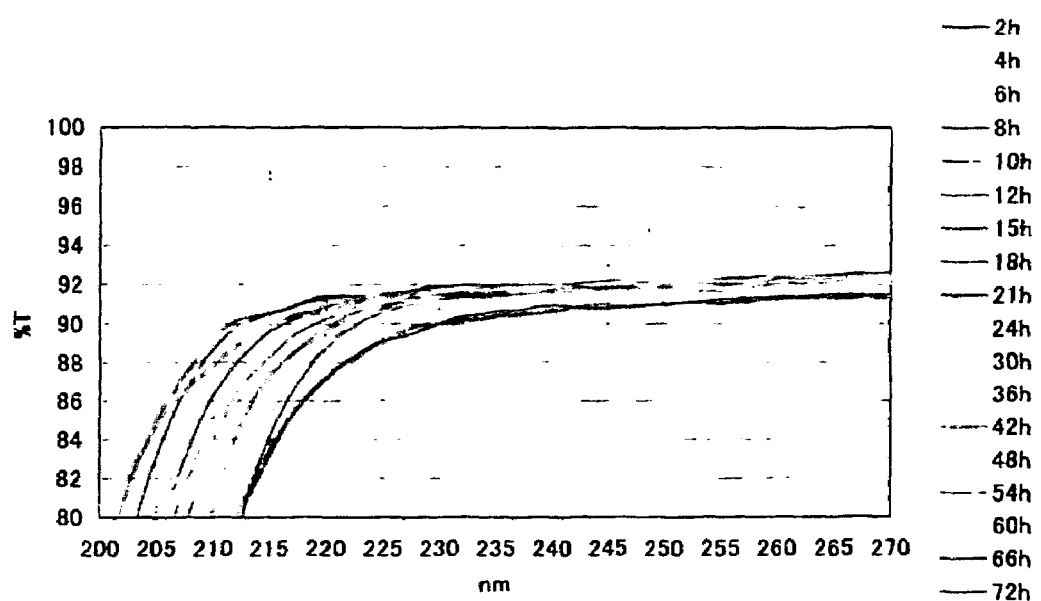
FIG. 2 shows the changes in transmittance at the times after predetermined irradiation periods in the case of the adhesive C.

FIG. 2 shows the changes in transmittance after predetermined periods of irradiation in the case of C.

In this case, no additive was added and no primer treatment was carried out. The irradiation conditions were: ultraviolet wavelength 365 nm and intensity 300 mW/cm$^2$.

Figure 3:
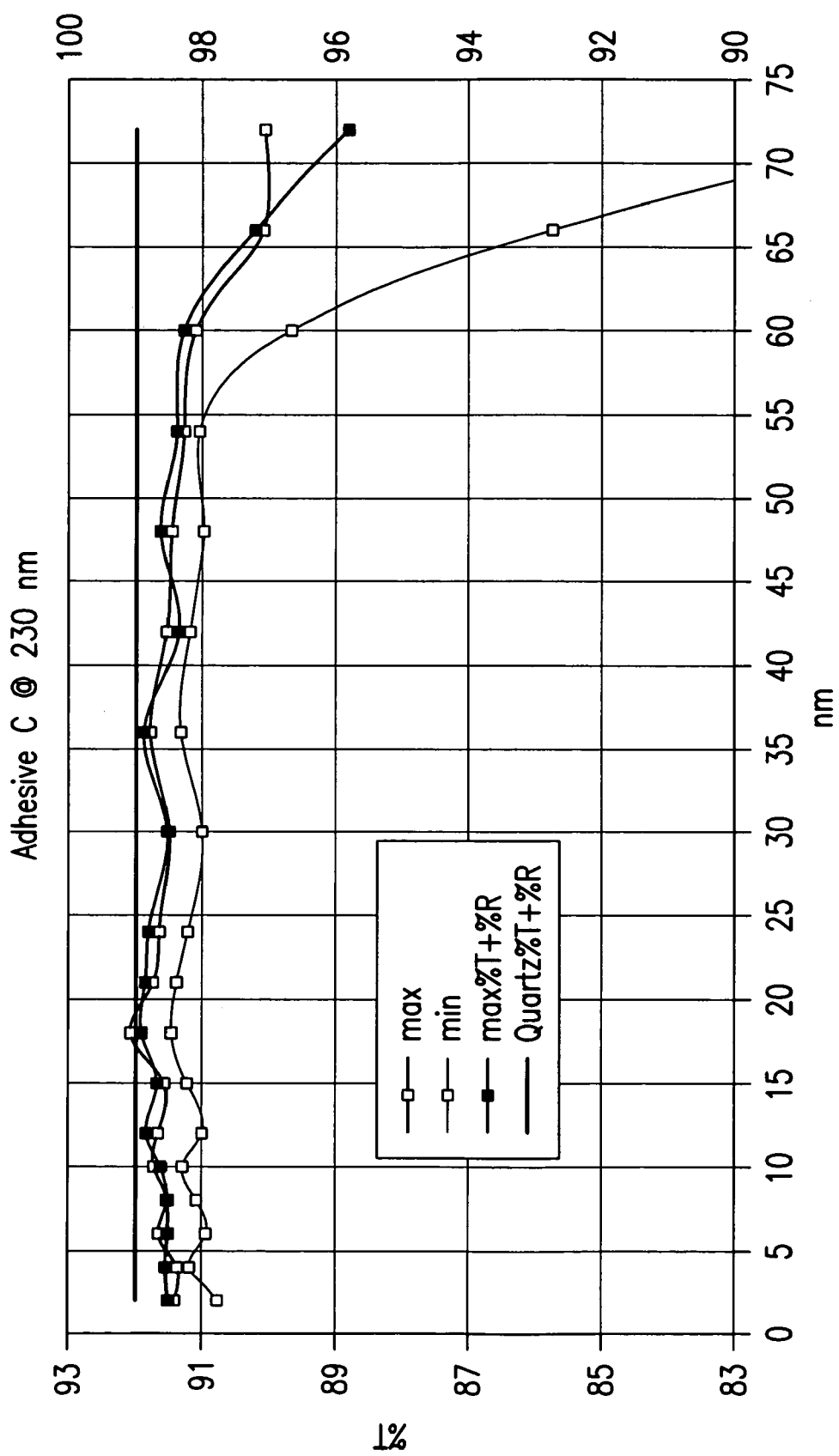
FIG. 3 shows the changes in transmittance at the times after predetermined periods of irradiation with ultraviolet light at 230 nm in the case of the adhesive C.

FIG. 3 shows the changes in transmittance after predetermined periods of irradiation with ultraviolet light at a wavelength of 230 nm.

In this case, no additive was added and no primer treatment was carried out. The irradiation conditions were: ultraviolet wavelength 365 nm and intensity 300 mW/cm$^2$.

As is evident from FIG. 3, ultraviolet transmissive adhesives showing a transmittance of about 92% until about 230 nm could be obtained. Thus, it becomes possible to cope with a deeper ultraviolet region without any significant chemical change or deterioration.

The adhesive C could show a satisfactory level of ultraviolet light resistance for about 60 hours and, thus, an adhesive higher in ultraviolet light resistance could be obtained.

Furthermore, the above-mentioned laminate lenses were applied to an optical system for illumination and tested for ultraviolet light resistance, whereupon turbidity and peeling, among others, were observed. However, the turbidity and peeling could be prevented by inserting plastic beads or the like between the laminated lens members.

The substrate (optical part) to be used is not limited to those used in the above examples but may be, for example, the one composed of two quarts lens members 3 joined together by adhesion.

The invention claimed is:

1. A laminate lens in an optical system for a precision inspecting device, comprising two laminate lens members joined together by means of a deep ultraviolet transmissive adhesive,
   wherein said deep ultraviolet transmissive adhesive comprises a substance represented by the following chemical formula:

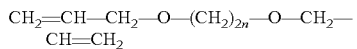

wherein, n is an odd number represented by 2m+1, wherein m is a natural number, and
   wherein one lens member is a quartz lens and the second lens member is a fluorite lens.

2. A laminate lens as claimed in claim 1, wherein the deep ultraviolet transmissive adhesive shows a transmittance of about 92% until about 230 nm.

3. A laminate lens as claimed in claim 1, wherein the deep ultraviolet transmissive adhesive comprises an additive selected from the group consisting of, a siloxane, and a silicone.

4. A laminate lens as claimed in claim 1, wherein each lens member has a surface subjected to a primer treatment for preventing peeling.

5. A laminate lens as claimed in claim 1, wherein the deep ultraviolet transmissive adhesive is provided between the two laminate lens members, and wherein
   the deep ultraviolet transmissive adhesive transmits deep ultraviolet light until about 230 nm.

* * * * *